(12) United States Patent
Silverstein

(10) Patent No.: US 7,190,805 B2
(45) Date of Patent: Mar. 13, 2007

(54) METHOD OF AND SYSTEM FOR EDGE WATERMARKING OF AN IMAGE

(75) Inventor: D. Amnon Silverstein, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 786 days.

(21) Appl. No.: 10/135,341

(22) Filed: Apr. 30, 2002

(65) Prior Publication Data

US 2003/0202678 A1    Oct. 30, 2003

(51) Int. Cl.
*G06K 9/00* (2006.01)
*G06K 15/00* (2006.01)
*G06K 9/50* (2006.01)
*G09C 3/00* (2006.01)

(52) U.S. Cl. ............... 382/100; 382/199; 382/282; 380/54; 358/3.28

(58) Field of Classification Search ............... None
See application file for complete search history.

(56) References Cited

U.S. PATENT DOCUMENTS

| 5,559,901 | A | * | 9/1996 | Lobregt ............... 382/256 |
| 5,606,609 | A | | 2/1997 | Houser et al. |
| 5,664,018 | A | | 9/1997 | Leighton |
| 5,862,260 | A | | 1/1999 | Rhoads |
| 5,875,040 | A | * | 2/1999 | Matraszek et al. ......... 358/453 |
| 5,905,800 | A | | 5/1999 | Moskowitz et al. |
| 6,002,772 | A | | 12/1999 | Saito |
| 6,141,753 | A | | 10/2000 | Zhao et al. |
| 6,198,832 | B1 | | 3/2001 | Maes et al. |
| 6,580,804 | B1 | * | 6/2003 | Abe ............... 382/100 |
| 6,600,828 | B1 | * | 7/2003 | Kawamura ............... 382/100 |
| 6,633,654 | B2 | * | 10/2003 | Hannigan et al. ............... 382/100 |
| 2001/0016051 | A1 | | 8/2001 | Rhoads |
| 2001/0032315 | A1 | | 10/2001 | Van Overveld et al. |
| 2001/0046307 | A1 | | 11/2001 | Wong |
| 2002/0015508 | A1 | | 2/2002 | Hannigan et al. |
| 2002/0104003 | A1 | * | 8/2002 | Iwamura ............... 713/176 |
| 2002/0118859 | A1 | * | 8/2002 | Stone et al. ............... 382/100 |
| 2002/0191812 | A1 | | 12/2002 | Kim |
| 2003/0068068 | A1 | * | 4/2003 | Kim et al. ............... 382/100 |

FOREIGN PATENT DOCUMENTS

WO    WO02/33650    4/2002

OTHER PUBLICATIONS

"Steganography: The Art of Information Hiding" E-Commerce Law and Strategy. (Nov. 2001) pp. 8-9.
"55:148 Digital Image Processing Chapter 4, Part 3." [online] [Retrieved On: Apr. 4, 2002] Retrieved From: http://www.icaen.uiowa.edu/ dip/LECTURE/PreProcessing3.html.

(Continued)

*Primary Examiner*—Matthew C. Bella
*Assistant Examiner*—Charles Kim

(57) ABSTRACT

A method according to one aspect of the invention includes data into an image including a detecting an edge in the image, identifying a portion of the image having a known spatial relationship with the edge, and applying a transform to the portion of the image to provide a data space for inserting the data into the image. A method of detecting data in an image includes detecting an edge in the image, identifying a portion of the image having a known spatial relationship with the edge, and applying a transformation to the portion of the image source to provide a data space from which to detect the data.

35 Claims, 9 Drawing Sheets

OTHER PUBLICATIONS

"Digimarc Corporation: The Leading Digital Watermarking Developer" [online] [Retrieved On: Apr. 4, 2002] Retrieved From: http://www.digimarc.com/index.asp.

Petitcolas, Fabien. "Publications" [online] [Retrieved On: Apr. 4, 2002] Retrieved From: http://www.cl.cam.ac.uk/ fapp2/publications/index/html.

"StegoArchive.Com-Steganography Information, Software, and News to Enhance Your Privacy" [online] [Retrieved On: Apr. 4, 2002] Retrieved From: http://steganography.tripod.com/stego.html.

"Steganography and Digital Watermarking" [online] [Retrieved On: Apr. 4, 2002] Retrieved From: http://www.jjtc.com/Steganography/.

* cited by examiner

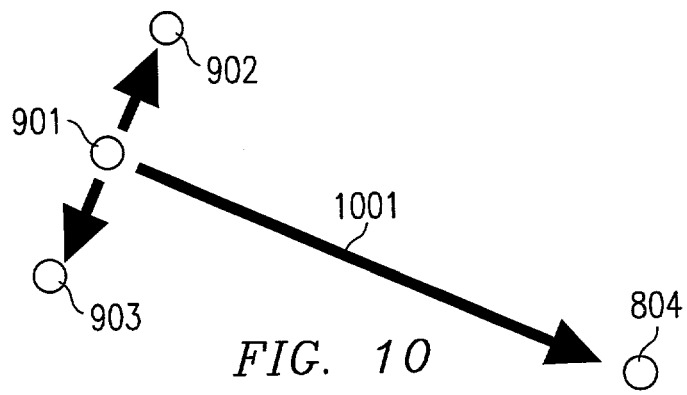
FIG. 10
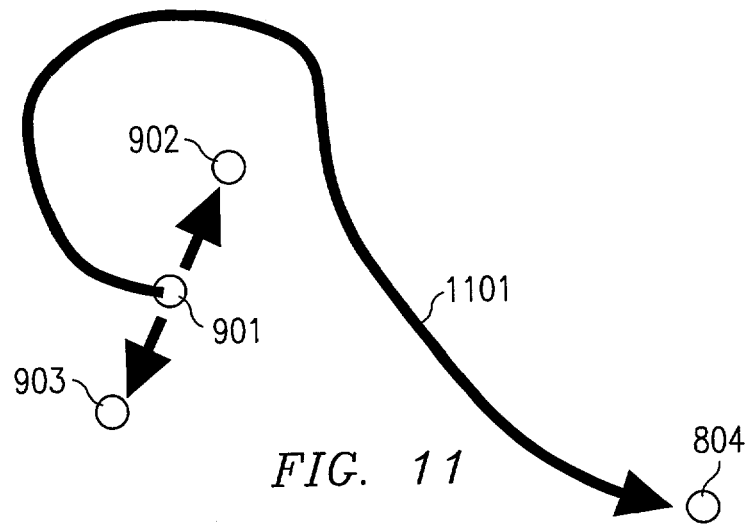
FIG. 11
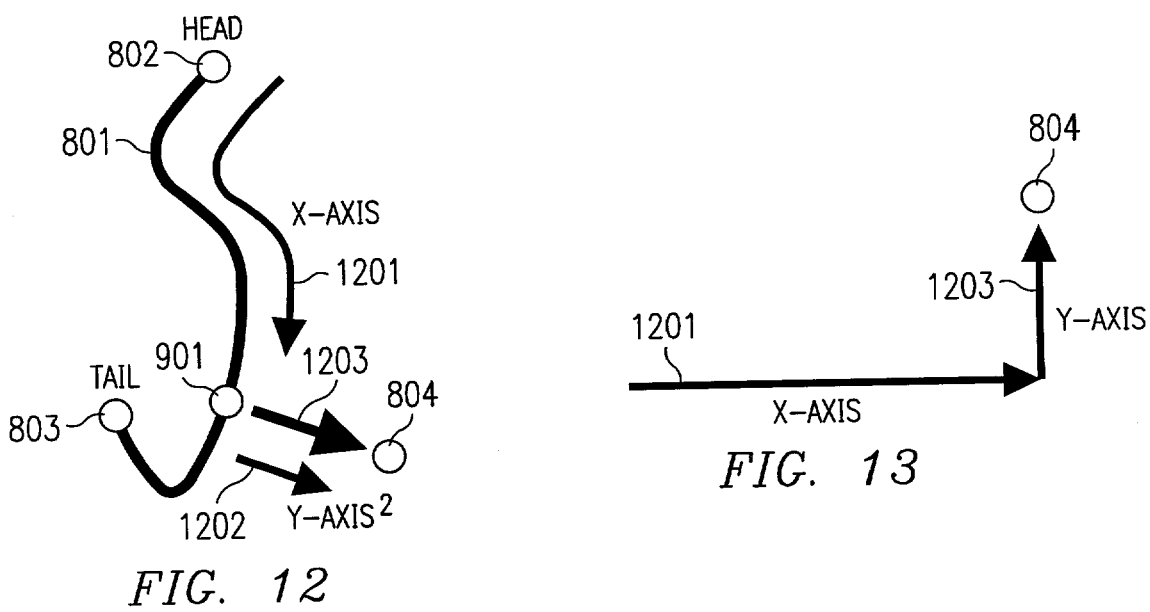
FIG. 12
FIG. 13

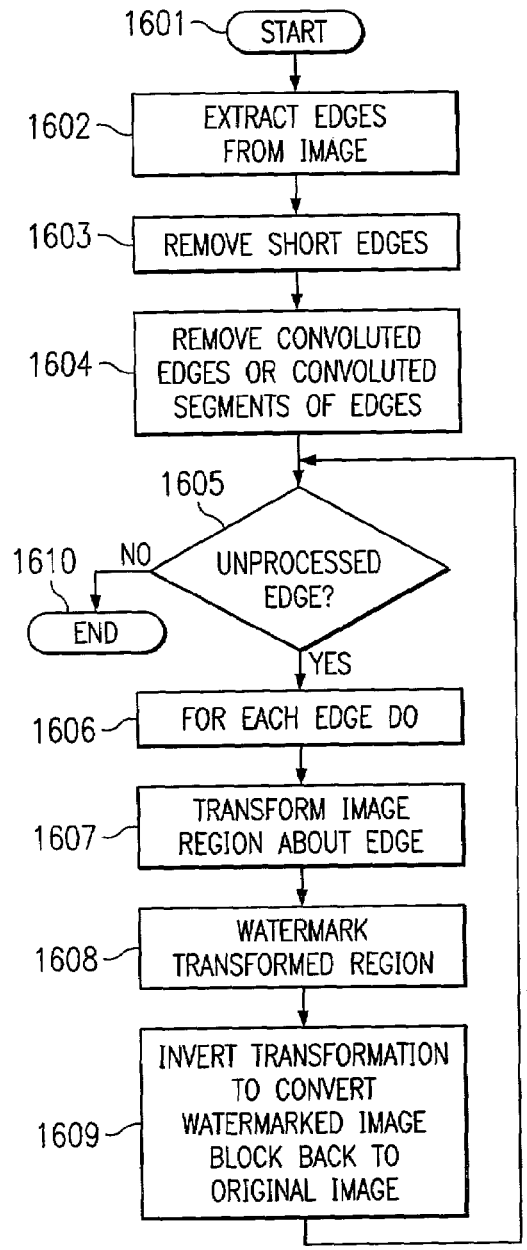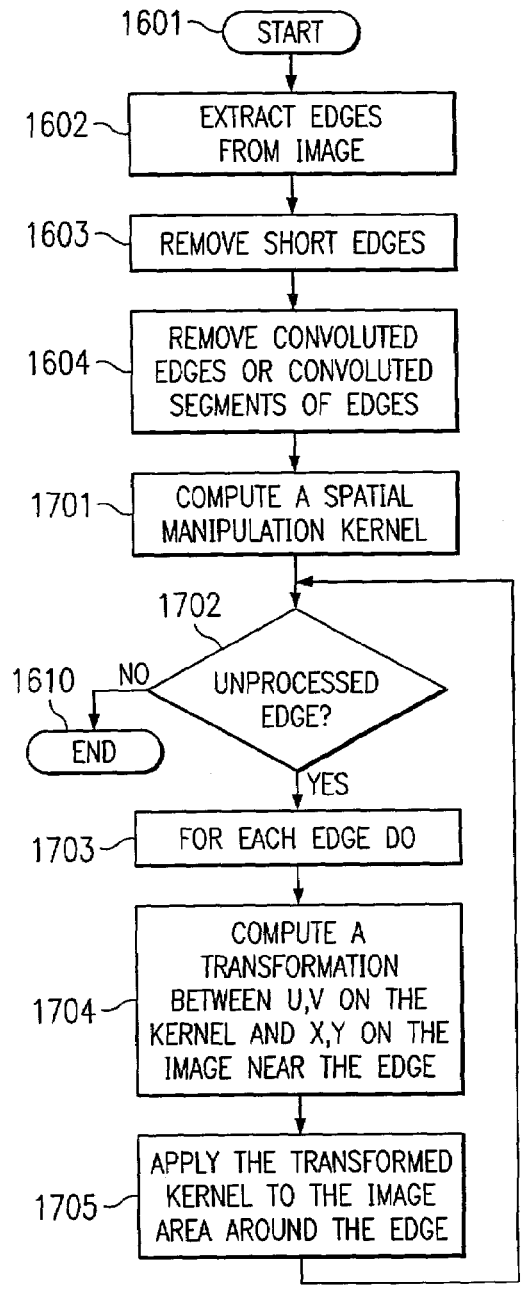

METHOD OF AND SYSTEM FOR EDGE WATERMARKING OF AN IMAGE

FIELD OF THE INVENTION

The invention is directed to digital images and, more specifically, to the secure watermarking and recovery of watermarks from a protected image.

BACKGROUND OF THE INVENTION

The proliferation and availability of computer systems together with networking capabilities provided by facilities such as the Internet, have provided means for the wide and almost effortless distribution of data. Once in electronic form, information may be readily copied and transmitted to almost endless numbers of recipients. This information may include digitized images or video. Because of the ease of making numerous copies of a digitized work, it is often difficult to enforce a copyright in the underlying work or to determine if the underlying work is subject to a copyright.

Several techniques have been proposed to address copyright protection of digital images. Those techniques that attempt to incorporate copyright information into the image data are generally known as "watermarking" in which copyright information is intermingled with the image data. One technique for incorporating such information into the image data uses steganography. Much has been written on the subject of steganography and is readily available on the worldwide web at the following URL's: http://www.jjtc-.com/steganography/; http://www.stegoarchive.com/; http://www.cl.cam.ac.uk/~fapp2/publications/index.html; and elsewhere. Patents directed to watermarking are further informative including Rhoads U.S. Patent Publication No. US 2001/0016051 A1 entitled "Method and Apparatus for Discerning Image Distortion by Reference to Encoded Marker Signals," published Aug. 23, 2001; Leighton, U.S. Pat. No. 5,664,018, entitled "Watermarking Process Resilient to Collusion Attacks," issued Sep. 2, 1997; Maes et al., U.S. Pat. No. 6,198,832, entitled "Embedding And Detecting a Watermark in Images," issued Mar. 6, 2001; and Wong, U.S. Patent Publication No. US 2001/0046307 A1, entitled "Method and Apparatus for Digital Watermarking of Images," published Nov. 29, 2001, all of which are incorporated herein by reference in their entireties.

In general, these watermarking techniques provide an invisible digital watermark by inserting watermark information into some portion of the image data, typically the Least Significant Bits (LSBs) of the image data so as to minimize distortion of the original image. In this case, the LSBs of intensity values for predetermined pixels are used to encode copyright information instead of intensity values. To retrieve the copyright information, a recipient must know and be able to identify the pixels containing the copyright information so as to extract information from the LSBs of the designated pixels. Thus, one weakness of such a watermarking scheme is its vulnerability to both accidental and deliberate attacks. This is because, in general, such techniques are sensitive to distortion of the image data caused by such operations as cropping and/or affine distortions, such as rotation and scaling of the image. Such distortions of the image make recovery of the watermark difficult or practically impossible.

In addition to use as a watermark, steganographic techniques are used to encode other information with an image, such as creation date, author, caption etc., and for the covert transmission of information. However, as with watermarks, this information may be rendered unretrievable by relatively minor distortion of the image.

Accordingly, there is a need in the art to provide a robust watermark and/or stegenaographic data encoding technique that are resistant to unintentional and deliberate attacks.

SUMMARY OF THE INVENTION

A method according to one aspect of the invention includes inserting a data into an image including detecting an edge in the image, identifying a portion of the image having a known spatial relationship with the edge, and applying a transform to the portion of the image to provide a data space for inserting data into the image.

According to another aspect of the invention, a method of detecting data encoded in an image includes detecting an edge in the image, identifying a portion of the image having a known spatial relationship with the edge, and applying a transform to the portion of the image to provide a data space from which to detect the data.

BRIEF DESCRIPTION OF THE DRAWINGS

FIG. 10 is a diagram illustrating determination of a contact side of an image pixel;

FIG. 11 is a diagram of an edge segment used to determine a contact side of an image pixel;

FIG. 12 is a diagram of an edge and traversal of the edge to provide a re-mapping of image data relative to the edge;

FIG. 13 is a diagram of image data re-mapped relative to a straightened edge;

FIG. 16 is a flowchart of a method of inserting watermark information into an image;

FIG. 17 is a flowchart of an alternate method for inserting watermark information into an image;

DETAILED DESCRIPTION OF THE INVENTION

An embodiment of the present invention provides for the insertion and recovery of watermark data by referencing the watermarks to identifiable features of a file in which the watermark data is embedded, which features are reference points for later identification and retrieval of the watermark information. In particular, features of a file may be selected such that a distortion of the data by a typical attack has a minimal local effect. Accordingly, identification of the feature, even after distortion, provides a basis for recovery of the watermark data. According to an embodiment of the invention, such features include, for example, edges contained within an image, the edges formed by any or a combination of changes of a feature. For example, edges may be identified based on changes in the luminance, chrominance, texture, or other image boundaries determined by any type of region segmentation. Watermark data may be attached to the edges as anchors so as to provide a reference point for later retrieval of the watermark data. The watermark data itself may be encoded in various ways, such as in the space domain by incorporating watermark data into pixel values, by incorporating watermark data into a frequency domain representation of the image in a vicinity a of selected edge or edges, or combinations thereof. An embodiment includes use of a variety of robust encoding and decoding schemes that are somewhat immune to and/or tolerate some degree of noise, distortion and/or data loss. Such data encoding and decoding techniques that may survive some distortion and resampling are available from, for example, Digimarc. See, for example, http://www.digimarc.com/support.cswater03.htm.

Figure 1:
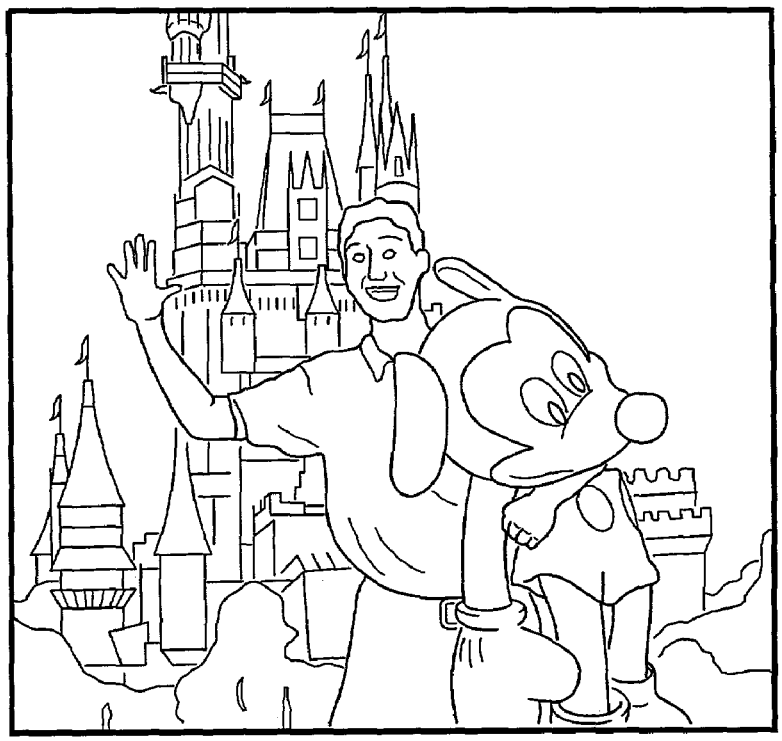
FIG. 1 shows an original image before watermark insertion.
Figure 2:
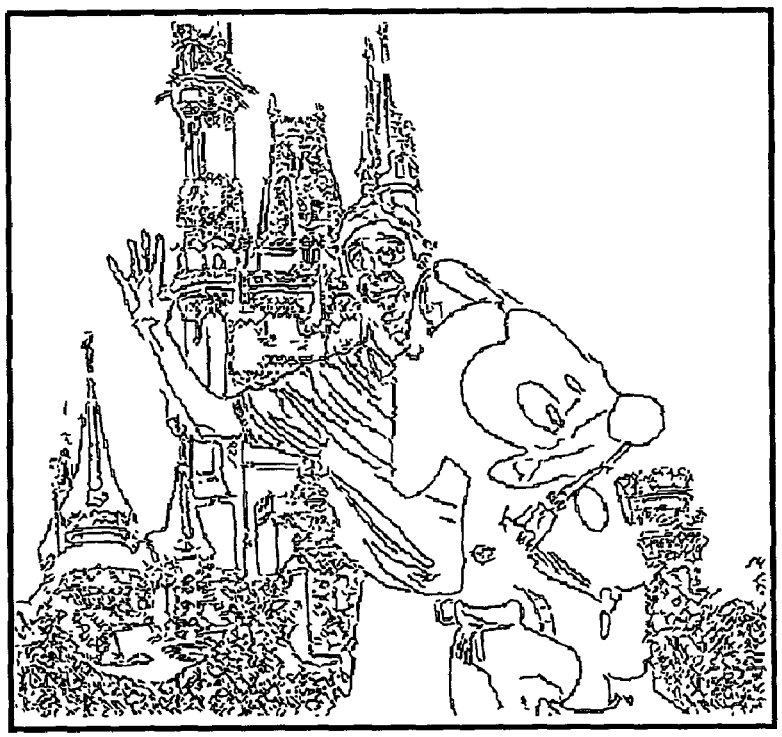
FIG. 2 is the image of FIG. 1 processed to identify edges.

FIG. 1 is an original image before watermark insertion. The image may be black and white or color. The image maybe processed to extract or identify edges from the image, as shown in FIG. 2, according to an embodiment of the present invention. These edges may be identified based upon illuminance, for example, in which case such edge extraction methods as Sobel, Roberts, Prewitt, and others (see, http://www.icaen.uiowa.edu/~dip/LECTURE/PreProcessing3.html#edge for further examples.) Likewise, other image boundary identification attributes, such as chrominance, and/or any type of region segmentation aspects, such as boundaries between image textures, may be used in combination with or in the alternative to the aforementioned illuminance (see, Jitendra Malik, Serge Belongie, Thomas Leung and Jianbo Shi, "Contour and Texture Analysis for Image Segmentation" submitted to International Journal of Computer Vision, January 2000; and K. L. Boyer and S. Sarkar, editors, *Perceptual Organization for Artificial Vision Systems*, Academic Publishers, 2000.) Embodiments of the present invention may utilize a variety of second order derivative operators, such as a Laplacian operator, Gaussian smoothing, a LOG operator, a Difference of Gaussian (DOG) operator, and/or a Canny edge detector, in detecting edges.

The set of edges may be processed to cull out less desirable edges that are unsuitable for incorporating watermark data. Such edges includes, for example, short and highly convoluted edges.

One method to remove short edges is to remove any edges that fail to have a predetermined number of contiguous pixels more than a set or a variable threshold. An adaptive threshold may be used so as to select a minimum number of edges where the edge detection routine is unable to identify sufficiently long edges. Additionally or alternatively, an iterative process may be used to increase the sensitivity of the edge detection process to identify more and/or longer edges.

Figure 3:
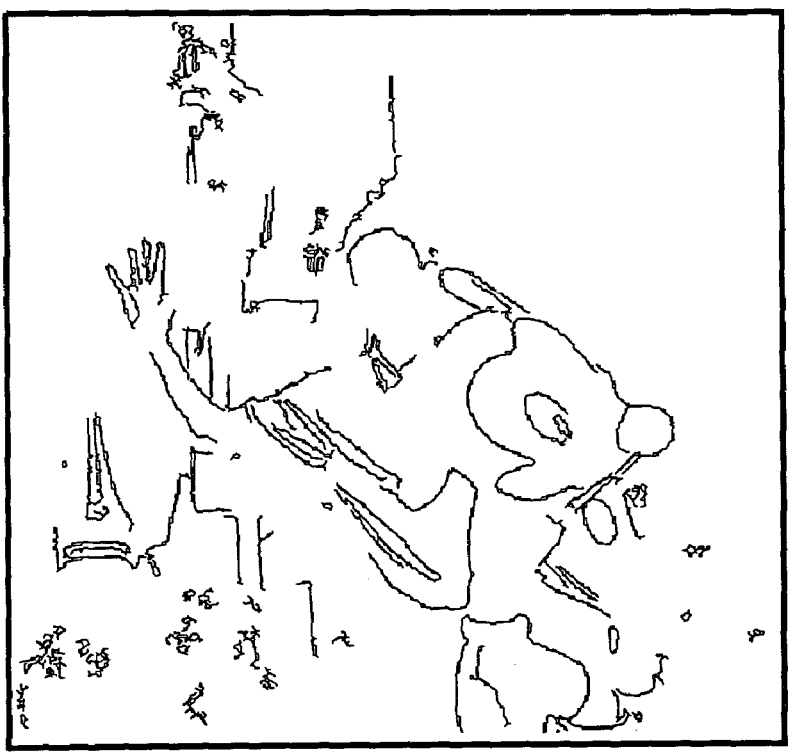
FIG. 3 depicts identification of edges from among those initially identified most amenable to encoding of watermark data.

Highly convoluted, tortuous and/or edges not readily supporting a transformation into rectangular data space as straighter edges may also be removed from consideration. Convoluted edges or convoluted segments of edges may be removed, for example, by identifying and eliminating from consideration edges having a radius of curvature that is unacceptably small, e.g., a radius of curvature that is smaller than a predetermined threshold value characteristic of a sharp turn or abrupt change in edge direction. Portions of an edge that have small radii may be removed to leave edge segments on either side of the convolution. If removal of portions of an edge results in the remaining portions being too short, the short portions may be discarded as well. FIG. 3 illustrates edges identified in the original image (FIG. 2) having desired characteristics of minimum lengths and straightness.

Once a set of acceptable edges are identified, image data adjacent to the edge may be spatially transformed together with the edge to form an image block. Transformation, according to an embodiment of the invention, converts the edge and adjacent image data by effectively straightening the edge into a linear direction in a single dimension, with distance from the edge computed in a linear or a non-linear relation (such as a power function) from the straightened edge.

Figure 4:
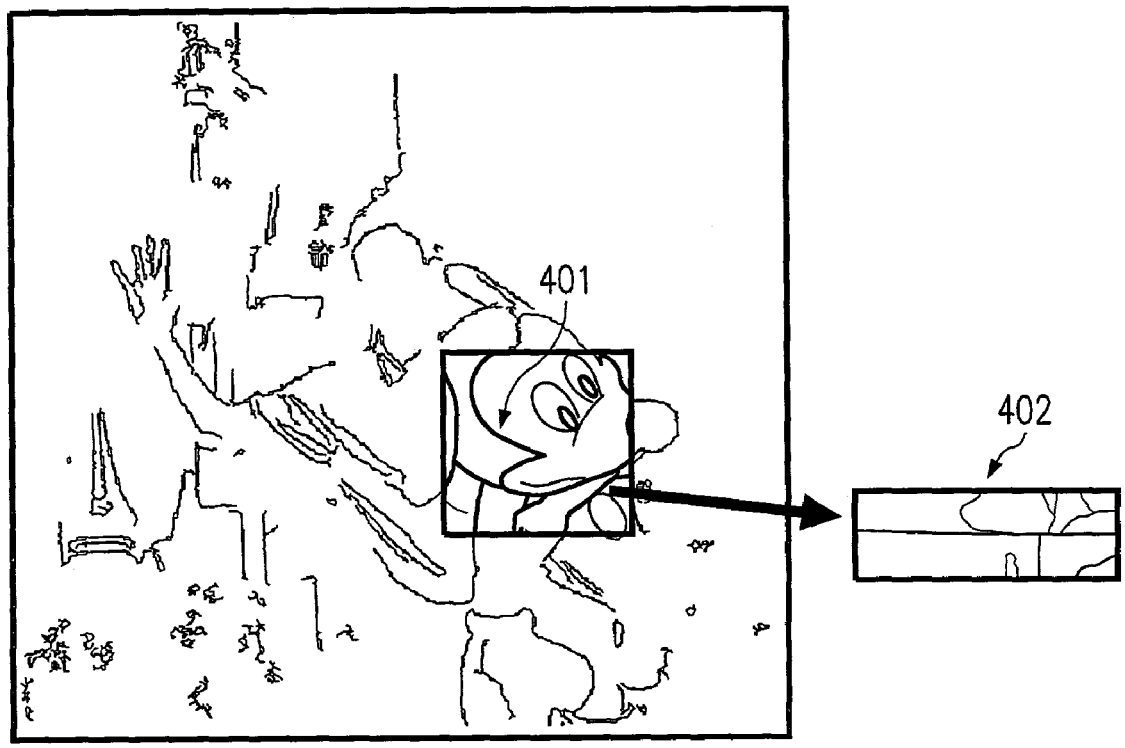
FIG. 4 depicts a portion of the image shown in FIG. 1 adjacent a selected edge and a corresponding transform of the image into a rectangular data space corresponding to straightening of the edge.

With reference to FIG. 4, edge 401 is identified together with image elements on either side of the edge, with this data transformed into a rectangular data space shown in insert 402. After transformation, edge 401 has been straightened and pixels associated with edge pixels may be aligned vertically with the corresponding edge pixels. An embodiment of a process for transforming the data is explained in further detail below.

Figure 5:
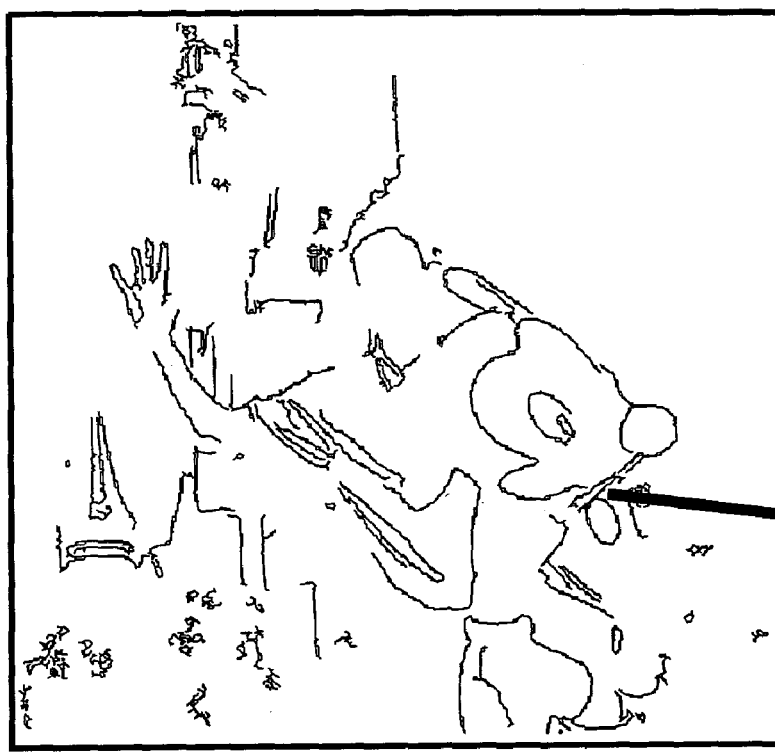
FIG. 5 shows insertion of watermark data into a transformed image.
Figure 6:
FIG. 6 shows the incorporation of transformed image data back into the original image of FIG. 1.
Figure 7:
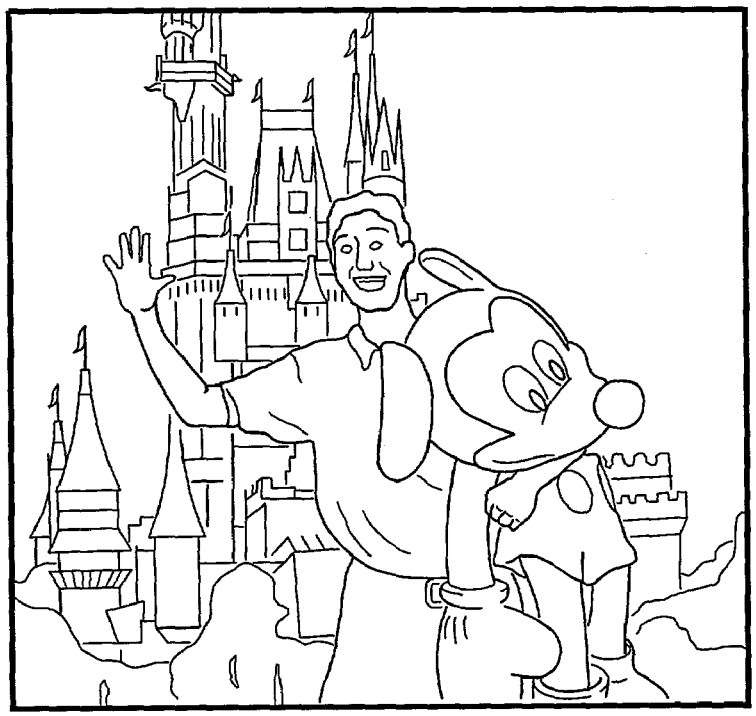
FIG. 7 illustrates an image watermarked according to an embodiment of the invention.
Figure 8:
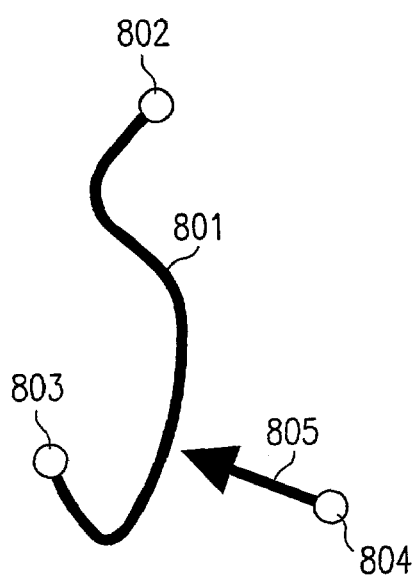
FIG. 8 is a diagram of an edge identified in an image.

Referring to FIG. 5, once the image region about the edge is transformed to create image block 402, the transformed region may be watermarked as shown in FIG. 5. The watermark may be inserted using any of numerous methods such as Digimarc (see, www.digimarc.com). Thus, the watermark may be inserted into the pixel luminance data or, alternatively into a frequency domain representation of the transformed region. In this later case, a suitable transform such as a Discrete Cosine Transform (DCT) may be used to convert the image block data from a spatial representation (i.e., positionally addressable luminance data) to the frequency domain. The frequency domain representation of the image may then be steganographically encoded with the watermark data and the steganographically marked frequency representation subjected to an inverse transform to provide a watermarked image block. In either case, once the watermarked image block is obtained, it may be subjected to a spatial inverse transform so as to regain its original shape as in the original image. The inverted transformed watermarked image block may then be inserted back into the original image at its original location 601 as shown in FIG. 6. The final watermarked image results from embedding watermarked data in all or a portion of the edges identified. Note that, depending on the amount of watermarked data and the length of edges, watermarked information may be duplicated throughout the image or may be spread throughout the image. The watermarked image is shown in FIG. 7.

A method of processing a single edge, according to an embodiment of the present invention, is further depicted in connection with FIGS. 8–13. Initially, with reference to FIG. 8, edge 801 may be identified by an appropriate edge extraction routine, followed by elimination of short and convoluted edges or edge segments, according to an embodiment of the invention. Remaining edge 801 may be processed to identify head end 802 and tail end 803. Numerous protocols may be implemented to identify edge head and tail ends including, for example, identifying an end closest to a predetermined corner of the image as a head, the opposite end being a tail. Other techniques may also be used including, identifying a particular side of the edge based on luminance value in comparison to luminance on an opposite side of the edge, the head and tail defined relative to left and right sides of the edge.

Figure 9:
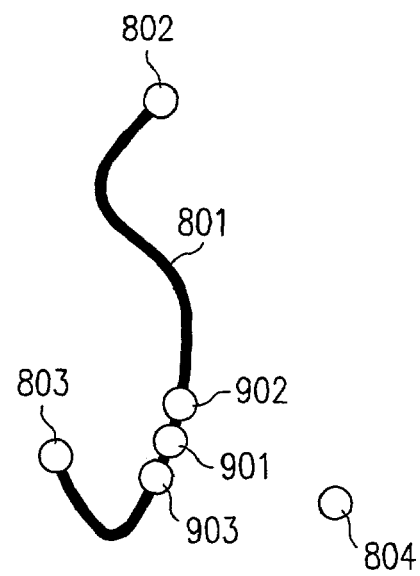
FIG. 9 is a diagram of an edge including association of an adjacent image pixel to a contact pixel of the edge.

Once the head and tail ends of an edge are identified, image pixels on each side of the edge may be identified and processing is performed to form a rectangular data space by transforming the image region. Thus, for example, image pixel 804 is associated with a pixel on the edge closest to image pixel 804. The closest pixel may be determined by identifying minimum distance 805 to edge 801 and the corresponding "contact" pixel in the edge. Referring to FIG. 9, image pixel 804 has been associated with contact pixel 901 of edge 801. Processing may then be performed to determine a contact side of the edge. This may be accomplished by identification of previous pixel 902 and following pixel 903 adjoining central contact pixel 901 along edge 801. As may be seen in FIG. 10, first distance 1001 is determined between contact pixel 901 and image pixel 804 to provide a first value measured to the left of curve 801 relative to a direction along the edge defined by the sequence pixels 902, 901, and 903 (i.e., in a direction from head end 802 to tail end 803). Conversely, line segment 1101 as shown in FIG. 11, emanating out towards the right side of edge 801 requires a change of direction and is longer than line segment 1001. From these measurements, it may be determined that image pixel 804 is properly identified to the left of contact pixel 901 and edge 801.

Processing may be performed to form a rectangular data space effectively straightening the edge so as to be represented in a single dimension while relative distance of image pixels from the edge are represented in a direction orthogonal to the edge. As shown in FIG. 12, X-axis 1201 tracks the shape and distance along edge 801 from head end 802 toward tail end 803. The distance between each contact pixel 901 on edge 801 and associated image pixels 804 represents the square of distance 1203 along Y-axis 1202. The square relationship between the line distance in image space and the data distance in rectangular space accounts for positional uncertainty with distance. This is expressed by the relationship $Y_2=Y/(Y)^{1/2}$ where $Y_2$ is the transformed Y distance from the line. This is consistent with the fact that positional certainty falls off with distance from the edge. That is, if the image is distorted by some sort of random process that adds gaussian noise to the distance estimate, the positional certainty drops off as the square of the distance. For example, a point ten pixels away from the edge on an undistorted image, after distortion of the image, will no longer be ten pixels away. If, for example, the random distortion moves the point by one pixel, then moving twice as far from the edge, 20 pixels, the expected error would be the square root of two pixels. This is smaller than twice the error because sometimes the error in the second segment will cancel the error in the first segment. Thus, according to an embodiment of the invention, the square function is added to remap the image data into a space where the error will be constant.

Figure 14:
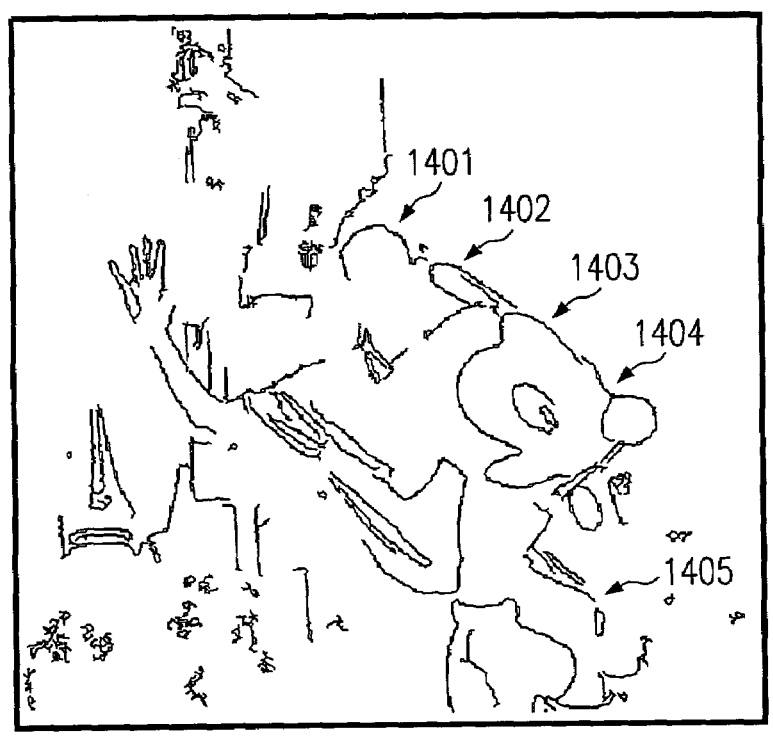
FIG. 14 shows edges used to hold one or more packets of data within an image.

The transformation of an embodiment of the invention converts the convoluted edge and adjacent image data into a straight representation, as depicted in FIG. 13, wherein the X-axis defines a distance along the edge from head toward tail and Y-axis 1203 represents the square of the distance from the edge to image pixel 804. The resulting transform creates the aforementioned data space as depicted in FIG. 5 into which watermarked data may be encoded, such as steganographically. Shown in FIG. 14, the encoded watermarked data may be included in multiple edges 1401 through 1405, each edge including the same or different data.

Figure 15:
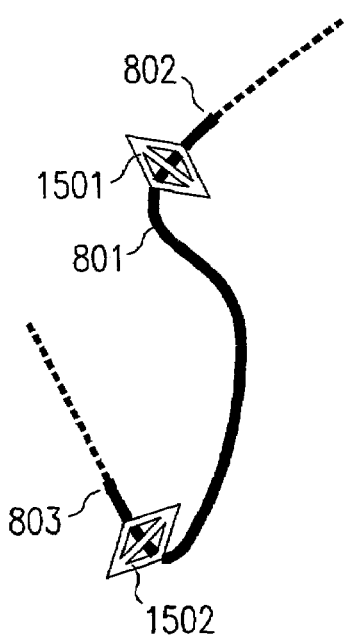
FIG. 15 is a diagram of an edge including encoded stop markers inserted along the edge.

Inasmuch as many edges tend to fade out rather than abruptly terminate, an embodiment of the invention further includes identifiers to signal the beginning and end of data encoded along an edge. This may be accomplished by encoding stop markers, such as head end stop marker 1501 and tail end stop marker 1502 shown in FIG. 15, into the edge so as to identify when a code is started and stopped. Criteria for stop marker placement may include quality indicia provided by the edge detection routine. Various techniques may be used to encode the stop markers including, for example, incorporating particular sequences of codings forming sentinels in the least significant bits of pixels forming the edge.

A method according to an embodiment of the invention is shown in connection with the flowchart of FIG. 16. Therein, after starting at step 1601, edges are extracted from the image at step 1602. As previously mentioned, the edges may be identified by a number of features of the file, in this case, image data, including, for example, changes in luminance, chrominance, texture, etc. While fixed edge extraction criteria and sensitivity may be employed, a dynamic system may be used, including a variable threshold so as to identify a minimum number of edges. Once a suitable set of edges have been identified, step 1603 removes short edges that would not provide sufficient information distance to encode a worthwhile amount of data or might otherwise be unidentifiable or lost if the image were distorted by cropping, rotation, blurring, etc. From the remaining edges, convoluted edges or convoluted segments of edges are eliminated at step 1604. If only highly convoluted segments are eliminated, then the remaining portions of edges are processed to again eliminate those that are too short. Convolution criteria for elimination of edges may threshold a minimum radius of curvature below which an edge is eliminated.

Decision 1605 forms the beginning of a loop for iterating through the remaining edges or some subset thereof. At step 1606, processing begins such that at step 1607 an image region about each edge is transformed into an image block. The transformation process will be described further in connection with FIG. 18. Once transformed, the region is watermarked at step 1608 using any of a number of methods of watermarking including the aforementioned steganographic techniques applied in either the spatial or frequency domains. Upon watermarking, the image block undergoes an inverse spatial transformation from rectangular space back into the original image space and is inserted back into the original image. Processing continues to address all edges for which watermarking is desired, terminating upon completion at step 1610.

Note that if the watermark adjusts the image in the spatial domain, for example, by a pseudo-random perturbation of pixel values, the spatial locations of the adjustments may be determined by transforming the coordinates of the adjustments through the edge transform. For example, one way to watermark an image is to "rubber stamp it" with a pseudo-random perturbation of each pixel value. A kernel of random offsets is generated, and this is added to the image at various positions. This kernel may be transformed for each edge before being added to the image.

An alternative method of inserting data using a marking kernel performs an inverse transform on the kernel itself from U, V to X, Y, the transformed kernel being applied to the original image. One advantage of transforming the kernel into image space is that resampling of the image data is avoided.

An alternative method of inserting a watermark is shown in the flowchart of FIG. 17. Starting at step 1601, steps 1602–1604 again extract edges from the image and eliminate unsuitable edges including those that are too short and too convoluted. Step 1701 computes a spatial manipulation kernel. This may be a two-dimensional matrix with coordinates U, V of random offsets for the rubber stamp method, for example.

Processing to incorporate watermark information into each edge, or some subset thereof, is initiated at step 1702, each edge being selected and processed beginning at step 1703. At step 1704, for each edge, a transformation between U,V is computed on the kernel, and X,Y on the image near the edge. At 1705 the transformed kernel is applied to the image area around the edge. For example, random offsets may be added to the image. Upon complete processing of all edges, the process terminates at step 1610.

Figure 18:
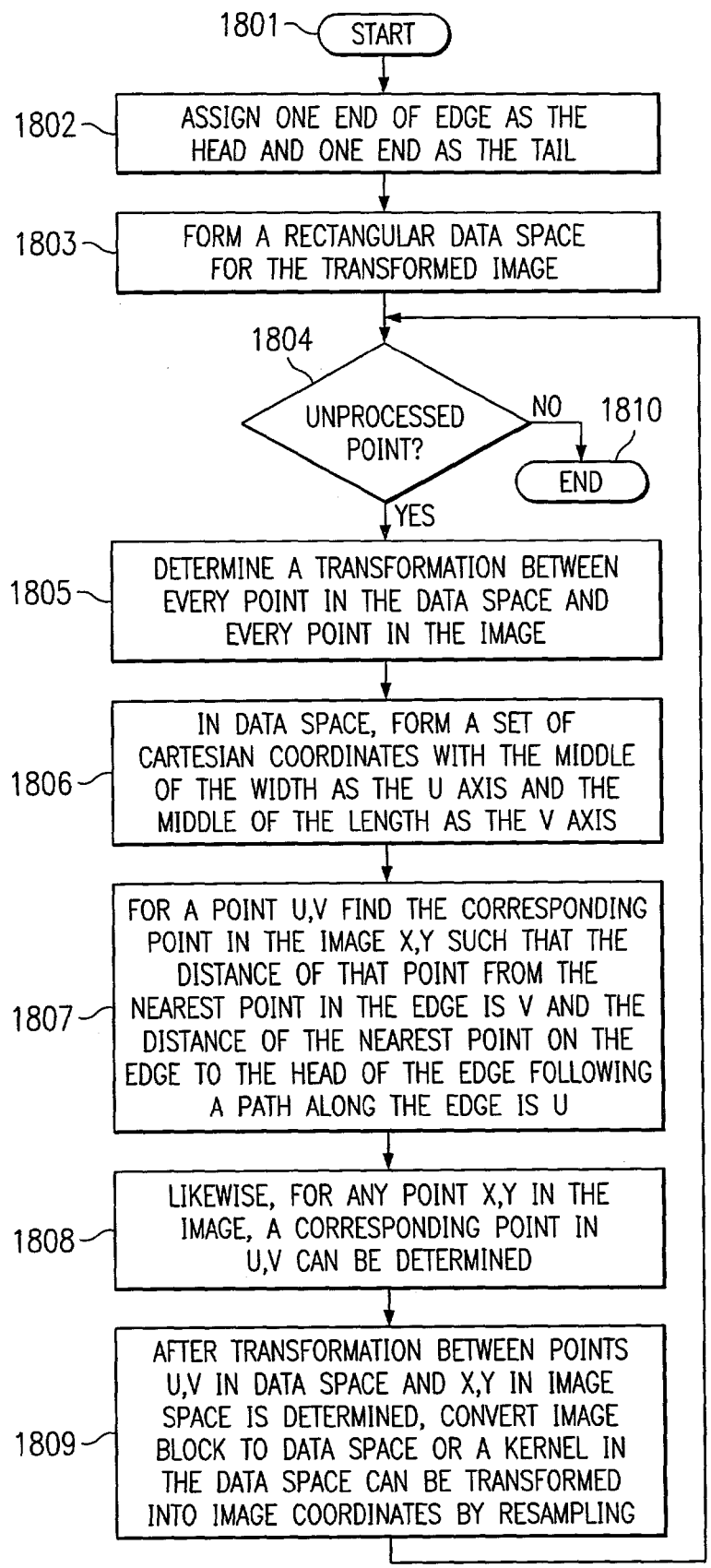
FIG. 18 is a flowchart of a method of transforming an image region about an edge to form an image block.

A method for transforming data surrounding an edge to and from a rectangular data space is shown in the flowchart of FIG. 18. Beginning at step 1801, at step 1802 one end of the edge is assigned as the head and one end as the tail. This assignment may be made by choosing the head to have the dark side of the illuminance edge as the left, for example. For a chrominance edge, the head may be chosen to have the bluer of the two colors on the left, for example. For texture edges, the texture with more high frequency energy may be chosen for the left. Many different methods may be used to consistently assign one end as a head and one end as a tail. Alternatively, one may arbitrarily be assigned as the head or the tail, but this may lead to some difficulty for the decoder. This is because, without designation of a start end, either the decoder would need to check for data in both directions along the edge or the code would need to be mirror symmetric so that direction of edge traversal would not be a factor.

Step 1803 forms a rectangular data space for the transformed image. The data space may have a length that corresponds to the length of the edge, but it may be sampled more finely or more coarsely than the edge. The rectangular data space may have any width, but in practice the width may be selected to be a fraction of the length (such as one quarter). The left-most point in the center of the width may be assigned as the head of the data space, and the right-most as the tail.

At step 1804, transformation processing is initiated for each point in the data space. Transformation according to an embodiment of the present invention includes steps 1805–1807. At step 1805, a transformation is determined between every point in the data space and every point in the image. Step 1806 forms a set of Cartesian coordinates in the data space with the middle of the width as the U-axis in the middle of the length as the V-axis. At step 1807, for a point U, V in the rectangular space the corresponding point in the image X, Y is found such that the distance of that point from the nearest point in the edge is V and the distance of the nearest point on the edge to the head of the edge, following a path along the edge, is U. Likewise, for any point X, Y in the image, a corresponding point in U, V may be determined at step 1808. That is, for a point U, V find the corresponding point in the image X, Y such that the distance of that point from the nearest point in the edge is V and the distance of the nearest point on the edge to the head of the edge following a path along the edge is a function of U. The function may either be proportional to U, or it may be a nonlinear function of U, such as $U=X/X^2$.

After the transformation between points U, V in the data space and X, Y in the image is determined, the image block is converted to the data space or a kernel in the data space is transformed into the image coordinates at step 1809 by using any standard resampling method, such as bicubic interpolation. Upon processing of all points, the method terminates at step 1810.

Figure 19:
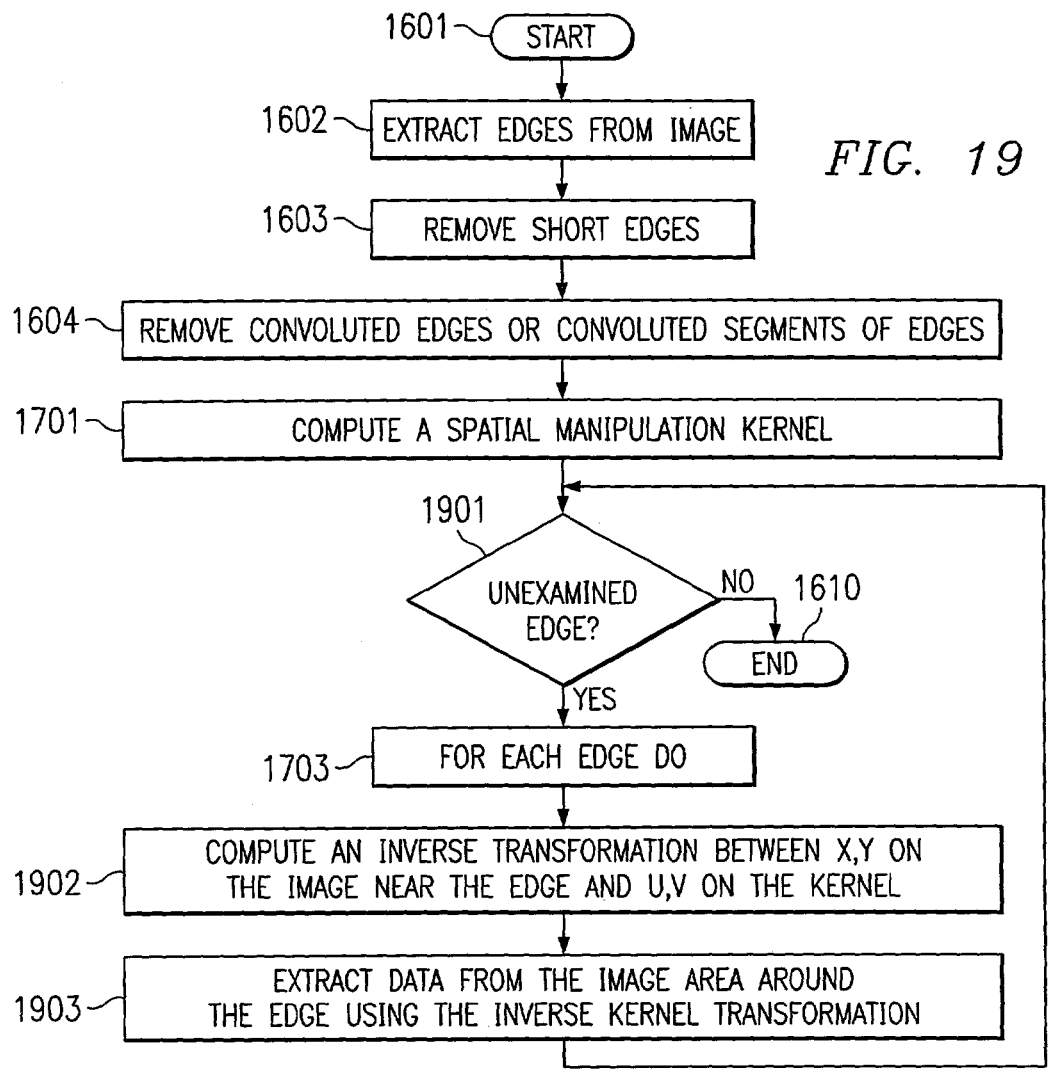
FIG. 19 is a flowchart of a method of recovering watermark information from an image.

Recovery of a watermark from an image is similar to the process of adding a watermark. An embodiment of this process is shown in FIG. 19. As shown therein, the decoding process is substantially similar to the method of encoding a watermark into an image. However, upon extraction of a rectangular block in U, V, the watermark data is extracted by a decoder instead of inserted by an encoder. More specifically, starting at step 1601, a method of reading or recovering a watermark includes steps 1602 through 1701 as previously detailed to identify edges that should identify and define areas of an image encoding hidden data and to formulate a transformation between the image space (X, Y) and a rectangular data space (U, V). Step 1901 is the beginning of a loop used to examine the identified edges. Each identified edge is processed at step 1703 and, at step 1902, an inverse transformation is computed between X, Y on the image near the edge and U, V on the kernel. At step 1903 data is extracted from the image area around the edge using the inverse kernel transformation.

Figure 20:
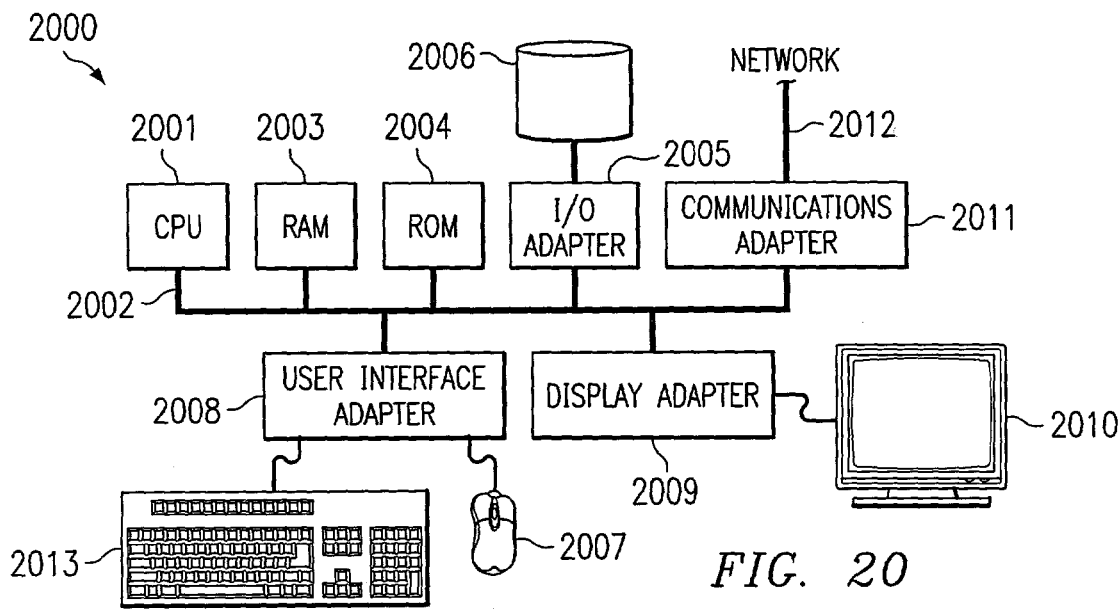
FIG. 20 is a block diagram of a system for inserting watermarks into and recovering watermarks from image data.

FIG. 20 is a diagram of a computer system capable of supporting and running a memory storage program implementing and maintaining a data structure according to an embodiment of the invention. Thus, although the present invention is adaptable to a wide range of data structures, programming languages, operating systems and hardware platforms and systems, FIG. 20 illustrates on such computer system 2000 comprising a platform suitable to support various embodiments of the present invention. This rather illustrative, generic computer system includes Central Processing Unit (CPU) 2001 coupled to system bus 2002. CPU 2001 may be any general purpose CPU, such as an HP PA-8500 or Intel Pentium processor. However, the present invention is not restricted by the architecture of CPU 2001 as long as CPU 2001 supports the inventive operations as described herein, e.g., the use of pointers. System bus 2002 is coupled to Random Access Memory (RAM) 2003, that may be SRAM, DRAM or SDRAM. ROM 2004 is also coupled to system bus 2002, that may be PROM, EPROM, or EEPROM. RAM 2003 and ROM 2004 hold user and system data and programs as is well known in the art. System bus 2002 is also coupled to Input/Output (I/O) controller card 2005, communications adapter card 2011, user interface card 2008, and display card 2009. The I/O card 2005 connects to storage devices 2006, such as one or more of a hard drive, a CD drive, a floppy disk drive, a tape drive, to the computer system. Communications card 2011 is adapted to couple computer system 2000 to network 2012, that may be one or more of a telephone network, a Local Area Network (LAN) and/or a Wide-Area Network (WAN), an Ethernet network, and/or the Internet network and may be wire line or wireless. User interface card 2008 couples user input devices, such as keyboard 2013 and pointing device 2007, to computer system 2000. Display card 2009 is driven by CPU 2001 to control display device 2010.

What is claimed is:

1. A method of inserting data into an image comprising the steps of:
   detecting an edge in said image;
   identifying a portion of said image having a known spatial relationship with said edge; and
   applying a transform to said portion of said image to provide a data space for inserting the data into said image, wherein applying a transform includes
   associating picture elements of said portion with nearest ones of edge points of said edge;
   determining distances between said picture elements and respective associated ones of said edge points; and
   re-mapping said picture elements relative to each other based on said distances.

2. The method according to claim 1 wherein said step of detecting said edge includes a step of identifying abrupt changes in said image.

3. The method according to claim 1 wherein said step of detecting an edge includes a step of applying a Sobel edge extraction method.

4. The method according to claim 1 wherein in said step of detecting said edge includes a step of applying a second order derivative operator to said image, said second order derivative operator selected from the group consisting of a Laplacian operator, Gaussian smoothing, a LOG operator, a Difference Gaussian (DOG) operator, and a Canny edge detector.

5. The method according to claim 1 wherein said step of detecting said edge includes a step of identifying said edge based on changes in lumninance, chrominance, or texture.

6. The method according to claim 1 wherein said re-mapping includes a step of transforming a linear distance between said picture elements and said respective associated ones of said edge points to an information distance.

7. The method according to claim 6 wherein said step of transforming includes a step of raising values associated with said linear distances to a power of x having a value in the range of 0<x<1.

8. The method according to claim 1 further comprising a step of assigning a direction to said edge.

9. The method according to claim 1 further comprising the steps of identifying a direction of a transition across said edge and, in response, assigning a direction to said edge.

10. The method according to claim 1 further comprising a step of steganographically inserting a digital watermark into said data space.

11. The method according to claim 1 further comprising a step of modulating a spatial domain representation of said data space with said data.

12. The method according to claim 11 wherein said step of modulating affects a characteristic of said spatial domain representation selected from the group consisting of luminance, color and texture.

13. The method according to claim 1 further comprising a step of modulating a frequency domain representation of said data space with said data to provide watermarked data.

14. The method according to claim 13 wherein said step of modulating includes the steps of: transforming a spatial domain representation of said data space into said frequency domain representation of said data space; and inversely-transforming said a frequency domain representation of said watermarked data to provide a spatial domain representation of said watermarked data.

15. The method according to claim 1 wherein said step of applying includes a step of inserting stop markers into image data associated with said edge.

16. The method according to claim 1 further comprising the steps of: detecting a plurality of edges in said image selecting ones of said edges satisfying selection criteria; and steganographically encoding said data into regions of said image associated with said selected edges.

17. The method according to claim 16 wherein said step of selecting includes a step of evaluating said edges with respect to said selection criteria, said selection criteria selecting from the group of properties consisting of edge lengths, edge straightness, and edge definition.

18. A method of detecting data encoded in an image comprising the steps of:
   detecting an edge in said image;
   identifying a portion of said image having a known spatial relationship with said edge; and
   applying a transform to said portion of said image so as to provide a data space from which to detect the, wherein applying a transform includes
   associating picture elements of said portion with nearest ones of edge points of said edge;
   determining distances between said picture elements and respective associated ones of said edge points; and
   re-mapping said picture elements relative to each other based on said distances.

19. The method according to claim 18 wherein said step of detecting said edge includes a step of identifying abrupt changes in said image.

20. The method according to claim 19 wherein said step of detecting an edge includes a step of applying a Sobel edge extraction method.

21. The method according to claim 19 wherein said step of identifying includes a step of detecting stop markers in image data associated with said edge.

22. The method according to claim 19 further comprising the steps of: detecting a plurality of edges in said image; selecting ones of said edges satisfying selection criteria; and steganographically decoding information in regions of said image associated with said selected edges.

23. The method according to claim 22 wherein said step of selecting includes a step of evaluating said edges with respect to said selection criteria, said selection criteria selecting from the group of properties consisting of edge length, edge straightness, and edge definition.

24. The method according to claim 18 wherein in said step of detecting said edge includes a step of applying a second order derivative operator to said image, said second order derivative operator selected from the group consisting of a Laplacian operator, Gaussian smoothing, a LOG operator, a Difference of Gaussian (DOG) operator, and a Canny edge detector.

25. The method according to claim 18 wherein said step of detecting said edge includes a step of identifying said edge based on changes in luminance, chrominance, or texture.

26. The method according to claim 18 wherein said re-mapping includes a step of transforming a linear distance between said picture elements and said respective associated ones of said edge points to an information distance.

27. The method according to claim 26 wherein said step of transforming includes a step of raising values associated with said linear distances to a power of x having a value in the range of 0<x<1.

28. The method according to claim 18 further comprising a step of assigning a direction to said edge.

29. The method according to claim 18 further comprising the steps of identifying a direction of a transition across said edge and, in response, assigning a direction to said edge.

30. The method according to claim 18 further comprising a step of steganographically reading said data space.

31. The method according to claim 18 further comprising a step of demodulating a spatial domain representation of said data space to recover said data.

32. The method according to claim 31 wherein said step of demodulating includes detecting a characteristic of said spatial domain representation selected from the group consisting of luminance, color and texture.

33. The method according to claim 18 further comprising a step of demodulating a frequency domain representation of said data space to recover said data.

34. The method according to claim 33 wherein said step of demodulating includes the step of transforming a spatial domain representation of said data space into said frequency domain representation of said data space.

35. A system for inserting data into an image comprising: means for detecting an edge in said image; means for identifying a portion of said image having a known spatial relationship with said edge; and means for applying a transform to said portion of said image to provide a data space for inserting the data into said image, wherein applying a transform includes associating picture elements of said portion with nearest ones of edge points of said edge; determining distances between said picture elements and respective associated ones of said edge points; and re-mapping said picture elements relative to each other based on said distances.

* * * * *

UNITED STATES PATENT AND TRADEMARK OFFICE
CERTIFICATE OF CORRECTION

PATENT NO. : 7,190,805 B2 Page 1 of 1
APPLICATION NO. : 10/135341
DATED : March 13, 2007
INVENTOR(S) : D. Amnon Silverstien It is certified that error appears in the above-identified patent and that said Letters Patent is hereby corrected as shown below:

In column 9, line 27, in Claim 4, after "Difference" insert -- of --.

In column 9, line 31, in Claim 5, delete "lumninance" and insert -- luminance --, therefor.

In column 9, line 62, in Claim 14, after "said" delete "a".

In column 10, line 2, in Claim 16, delete "image" and insert -- image; --, therefor.

In column 10, line 10, in Claim 17, delete "lengths" and insert -- length --, therefor.

In column 10, line 17, in Claim 18, delete "the," and insert -- the data, --, therefor.

Signed and Sealed this

Twenty-eighth Day of October, 2008

JON W. DUDAS
*Director of the United States Patent and Trademark Office*